(12) United States Patent
McDowell

(10) Patent No.: US 6,603,535 B1
(45) Date of Patent: Aug. 5, 2003

(54) STEREO IMAGING VELOCIMETRY SYSTEM AND METHOD

(75) Inventor: Mark McDowell, Cleveland, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/232,862

(22) Filed: Aug. 30, 2002

(51) Int. Cl.[7] .................. G01P 3/36; G01N 21/00; H04N 7/18
(52) U.S. Cl. .................. 356/28; 348/135; 356/337
(58) Field of Search .................. 356/28, 337; 348/135

(56) References Cited

U.S. PATENT DOCUMENTS

| | | |
|---|---|---|
| 4,337,049 A | 6/1982 | Connelly |
| 4,709,580 A | 12/1987 | Butts, Jr. et al. |
| 4,729,109 A | 3/1988 | Adrian et al. |
| 4,859,055 A * | 8/1989 | Gal et al. .................. 356/28 |
| 4,919,536 A | 4/1990 | Komine |
| 4,988,191 A | 1/1991 | Adrian et al. |
| 5,011,278 A | 4/1991 | Farrell |
| 5,110,204 A | 5/1992 | Miles et al. |
| 5,333,044 A | 7/1994 | Shaffer |
| 5,396,331 A | 3/1995 | Kitoh et al. |
| 5,440,144 A | 8/1995 | Raffel et al. |
| 5,491,642 A | 2/1996 | Wormell et al. |
| 5,532,814 A | 7/1996 | Cha |
| 5,548,419 A | 8/1996 | Adrian et al. |
| 5,610,703 A | 3/1997 | Raffel et al. |
| 5,905,568 A | 5/1999 | McDowell et al. |
| 6,013,921 A | 1/2000 | Moller et al. |
| 6,108,458 A | 8/2000 | Hart |
| 6,115,120 A * | 9/2000 | Moriya et al. .................. 356/337 |
| 6,276,217 B1 | 8/2001 | Hirano et al. |
| 6,496,262 B1 * | 12/2002 | Meng et al. .................. 356/457 |
| 6,542,226 B1 * | 4/2003 | Wernet .................. 356/28.5 |

* cited by examiner

Primary Examiner—Thomas H. Tarcza
Assistant Examiner—Brian Andrea
(74) Attorney, Agent, or Firm—Kent N. Stone

(57) ABSTRACT

A system and a method is provided for measuring three-dimensional velocities at a plurality of points in a fluid employing at least two cameras positioned approximately perpendicular to one another. Image frames captured by the cameras may be filtered using background subtraction with outlier rejection with spike-removal filtering. The cameras may calibrated to accurately represent image coordinates in a world coordinate system using calibration grids modified using warp transformations. The two-dimensional views of the cameras may be recorded for image processing and particle track determination. The tracer particles may be tracked on a two-dimensional basis and then stereo matched to obtain three-dimensional locations of the particles as a function of time so that velocities can be measured therefrom.

23 Claims, 12 Drawing Sheets

Right View
Smaller port cuts off corner points

Left View
All points are visible b. Track Smoothness Error a. Track Straightness Error Table 1

Input Data Set:

| X | Y | Z |
|---|---|---|
| 0.100000 | 0.000000 | 0.000000 |
| 0.100000 | 0.020000 | 0.000000 |
| 0.090000 | 0.040000 | 0.000000 |
| 0.100000 | 0.000000 | 1.000000 |
| 0.100000 | 0.020000 | 1.000000 |
| 0.090000 | 0.040000 | 1.000000 |
| 0.100000 | 0.000000 | 2.000000 |
| 0.100000 | 0.020000 | 2.000000 |
| 0.090000 | 0.040000 | 2.000000 |
| 0.100000 | 0.000000 | 3.000000 |
| 0.100000 | 0.020000 | 3.000000 |
| 0.090000 | 0.040000 | 3.000000 |

Table 2

Output Data Set:

| X1 | Y1 | Z1 | X2 | Y2 | Z2 | X3 | Y3 | Z3 |
|---|---|---|---|---|---|---|---|---|
| 0.10000 | 0.00000 | 0.00000 | 0.09781 | 0.02079 | 0.00000 | 0.09135 | 0.04067 | 0.00000 |
| 0.10000 | 0.00000 | 1.00000 | 0.09781 | 0.02079 | 1.00000 | 0.09135 | 0.04067 | 1.00000 |
| 0.10000 | 0.00000 | 2.00000 | 0.09781 | 0.02079 | 2.00000 | 0.09135 | 0.04067 | 2.00000 |
| 0.10000 | 0.00000 | 3.00000 | 0.09781 | 0.02079 | 3.00000 | 0.09135 | 0.04067 | 3.00000 |

STEREO IMAGING VELOCIMETRY SYSTEM AND METHOD

ORIGIN OF THE INVENTION

The invention described herein was made by an employee of the United States Government and may be manufactured and used by or for the Government for Government purposes without the payment of any royalties thereon or therefor.

TECHNICAL FIELD

This invention relates to stereo imaging velocimetry. Specifically, this invention relates to a system and method for measuring three-dimensional velocities at a plurality of points in a fluid seeded with tracer particles.

BACKGROUND ART

Stereo imaging velocimetry seeks to provide a three-dimensional measurement of the velocity of a fluid. A recent example of a stereo imaging velocimetry system is shown in U.S. Pat. No. 5,905,568 of May 18, 1999 which is incorporated by reference herein in its entirety. In this system, a fluid-flow is analyzed using particle tracking. Particle tracking seeks to assign velocity vectors to sequences of still image frames of particles suspended in a transparent fluid, air or gas experiment. As used here, a particle track is a time-sequence of images of the same particle. This requires that high quality particle images be obtained from a system of moving particles. Unfortunately, in practice, images are often contaminated by a variety of noise sources, which introduces significant errors in the velocity measurements. Such errors can cause noise to be misidentified as particles and can cause particles to be misidentified as background noise. A failure to identify a single particle in only one of a sequence of image frames can result in the entire track of the particle being lost.

Examples of noise include stationary noise and moving noise. The primary source of stationary noise may be the container which holds the particles and the experiment. Typically the particles are illuminated with a bright light source, such as a strobe light, which may produce strong glare spots from the container bottom, its bounding side walls, and the liquid surface. Weaker stationary images may also appear within the central field of view due to reflections from overhead lights for example.

Moving noise is generally a reflection of the particles from the surfaces of the container. Moving noise typically occurs at the periphery of the system and as a result may not pose a major problem during processing of image tracks. However stationary noise may introduce image clutter throughout the image which complicates the tracking of tracer particles.

The traditional approach to removing stationary noise under these conditions is to perform time-average, background image subtractions. In this procedure, each image frame is considered part of a shorter fixed-length subsequence of the original time-sequence of image frames, with a 'Frame of Interest' image centered in the subsequence. The 'Frame of Interest' is defined for a given subsequence to be that image frame in the subsequence from which we subtract the time-averaged image calculated using all images in the subsequence. FIG. 1 shows a subsequence 10 which is five image frames in length and whose Frame of Interest 12 is centered in the interval. The image frames comprising the subsequence are averaged together on a pixel-by-pixel basis, and the resultant time-averaged image frame 14 is subtracted from the target image. The net effect to the resulting frame of interest 16 is that rapidly moving particles contribute little to the pixels along their path on average and, therefore are not removed when the average value is subtracted. On the other hand, stationary noise is subtracted out because it is present in every image frame.

Unfortunately when attempting to isolate moving particles by subtracting out a time-average subsequence, two major problems occur. First, requiring that particles be moving relatively rapidly means that slowly-moving particles will be subtracted out as background noise. Second, even rapidly-moving particles will tend to attenuate themselves since they also appear within the subsequence.

The following examples illustrate that these effects can be serious. As shown in FIG. 2, a subsequence of N images 22 beginning at time $t\alpha$, may be taken from a longer sequence of M images 20. The subsequence of intensity values of the pixel 24 located at row 'r' and column 'c' within the subsequence of images 22 may be denoted by $S^\alpha(r,c)$. Since $S^\alpha(r,c)$ is chronologically ordered, the subscript 'k' may be used to denote the kth value of the time sequence: $S^\alpha_k(r,c)$. The pixel values may also be placed in an ascending order which may be denoted as $I^\alpha(r,c)$. With this notation, $I^\alpha_k(r,c)$ refers to the kth smallest intensity value in $S^\alpha(r,c)$. Also with this notation $I^\alpha_N(r,c)$ refers to the largest intensity value.

When a single particle image passes over a specific pixel during the subsequence, the given particle may intersect with this pixel in one or more frames captured during the time period of the subsequence. To simplify the example, it is assumed that no other particle intersects this specific pixel during the time period in question. In addition, gray scale pixel values may range between 0 (black) and 255 (white) and particles are assumed to be white on a black background. However, as shown herein in the drawings, particles are depicted as black spots on a white background to enable the particles in the drawings to be more easily viewed.

In a first example, a subsequence showing a relatively fast moving particle is processed using time averaging. Equation 1 shows an example of the unprocessed ordered subsequence of intensity values (denoted as $I_F$) for a specific pixel of a subsequence.

$$I_F = [13, 45, 67, *126, *244] \tag{1}$$

Here the intensity values marked with an "*" correspond to the fast moving particle. The average of the intensity values for $I_F$ is 99. Equation 2 shows an example of a processed ordered subsequence of intensity values (denoted as $I2_F$) which corresponds to the unprocessed ordered subsequence $I_F$.

$$I2_F = \max\{I_F - \text{average}(I_F), 0\} = [0, 0, 0, *27, *145] \tag{2}$$

Here the intensity values for $I2_F$ are obtained from $I_F$ by first subtracting out the time-averaged sequence value, and second setting negative values to zero. In this example the processed subsequence of pixel values $I2_F$, while greatly attenuated, still retain information of the particle passing within each image frame where it was actually present. The fluctuation in the background intensity is a result of low-level noise.

Unfortunately using time-averaged background subtraction for a particle moving much more slowly than the fast moving particle in the previous example may produce undesirable results. In a second example, a subsequence showing a slower moving particle which is not as well lit is processed using time averaging. Such a particle for example may be moving towards the camera along the sides of the experimental chamber. Equation 3 shows an example of the unprocessed ordered subsequence of intensity values (denoted as $I_S$) for a specific pixel of such a subsequence.

$$I_S=[70, *120, *143, *168, *176] \quad [3]$$

Here the intensity values marked with an "*" correspond to the slow moving particle. The average of the intensity values for $I_S$ is 137. Since the particle is moving more slowly, it is present at the pixel under consideration in four of the five frames of the subsequence.

Equation 4 shows an example of a processed ordered subsequence of intensity values (denoted as $I2_S$) which corresponds to the unprocessed ordered subsequence $I_S$.

$$I2_S=\max\{I_S-\text{average}(I_S), 0\}=[0, *0, *8, 33, *41] \quad [4]$$

As in the previous example, the intensity values for $I2_S$ are obtained from $I_S$ by first subtracting out the time-averaged sequence value, and second setting negative values to zero. In this example the intensity value of *0 in Equation 4 represents a frame when the particle intersected the pixel. However, it has been set to zero (background) due to this prior art method of time-averaged background subtraction.

In addition the use of a threshold for significance would most likely cause the intensify value of "*8" in Equation 4 to also be set to zero, further reducing the number of image frames which correctly identify the particle. If the Frame of Interest is one of the frames with a zero or background pixel value, then the particle will disappear from that frame at that pixel location. Unfortunately, when processing frames, the loss of even one frame in the sequence of frames constituting the velocity measurement is enough to cause the loss of that track. When bounded search regions are used to place limits on the size of the search space and thereby reduce the complexity of the tracking algorithm, the opportunity to loose particle tracks may be further increased as a result of time-average background subtraction.

When the velocity measurement is calculated using four frames, there are then four opportunities for a dropped particle to disrupt the identification of the track. The number of tracks in an experiment will also multiply this problem as a result of a phenomenon referred to as track cannibalization. With this phenomenon, not only are the fragmented tracks lost, but also the unassigned particle images which remain behind interact with surrounding tracks during their assignment to further reduce the number of tracks correctly assigned.

In addition time-averaged background subtraction of a subsequence that does not contain a particle may also produce undesirable results. In a third example, a subsequence showing stationary noise of the same magnitude as particle signals is processed using time-averaged background subtraction. Equation 3 shows an example of the unprocessed ordered subsequence of intensity values (denoted as $I_N$) for a specific pixel which experiences only stationery noise during the subsequence of interest.

$$I_N=[0, 13, 45, 51, 67] \quad [5]$$

Here no intensity values are marked with an "*" as none of the values corresponds to a moving particle. The average of the intensity values for $I_N$ is 35. Subsequence $I_N$ includes values which fluctuate quite a bit. This is not uncommon in tracking experiments. For example imperfect synchronization between the strobe and the recording system may be a source of fluctuation of pixel values for otherwise stationary signals. Hence it often common to see background values fluctuate such that intensity values in one or two frames may be well below the intensity values in other frames as shown in Equation 5. In addition glare spots may also be a source of fluctuations in intensity values. Attempts to subtract them out invariably leave "scintillations" throughout the region of the glare.

Equation 6 shows an example of a processed ordered subsequence of intensity values (denoted as $I2_N$) which corresponds to the unprocessed ordered subsequence $I_N$.

$$I2_N=\max\{I_N-\text{average}(I_N), 0\}=[0, 0, 10, 16, 32] \quad [6]$$

As in the previous example, the intensity values for $I2_N$ are obtained from $I_N$ by first subtracting out the time-averaged sequence value, and second setting negative values to zero. In this example the resulting non zero intensity values for the stationary noise are of the same magnitude as the particle signals shown in the previous examples. Any attempt to filter these values out will only server to magnify the problems outlined above concerning loss of tracks. Furthermore, the values depicted in this example are relatively low for stationary noise, which values can run the full range along the boundaries of the containing vessel. The number of lost tracks would be magnified by intensity values for stationary noise which fluctuates over a greater range.

Consequently there exists a need for a system and method of processing image frames in a stereo imaging velocimetry system which is more accurate at identifying true particle image tracks.

In addition there exists a need for a system and method of processing image frames in a stereo imaging velocimetry system which minimizes lost tracks due to slower moving particles.

There further exists a need for a system and method of processing image frames in a stereo imaging velocimetry system which minimizes lost tracks due to stationary noise.

DISCLOSURE OF INVENTION

It is an object of an exemplary form of the present invention to provide a system and method for measuring three-dimensional velocities at a plurality of points in a fluid.

It is a further object of an exemplary form of the present invention to provide a system and method for collecting quantitatively, three-dimensional flow data from an optically transparent fluid having tracer particles.

It is a further object of the present invention to provide a stereo imaging velocimetry system and method with improved accuracy.

It is a further object of the present invention to provide a stereo imaging velocimetry system and method which is more accurate at identifying true particle image tracks.

It is a further object of the present invention to provide a stereo imaging velocimetry system and method which minimizes lost tracks due to slower moving particles.

It is a further object of the present invention to provide a stereo imaging velocimetry system and method which minimizes lost tracks due to stationary noise.

Further objects of the present invention will be made apparent in the following Best Modes for Carrying Out Invention and the appended Claims.

The foregoing objects may be accomplished in an exemplary embodiment of the invention by a system that measures three-dimensional velocities at a plurality of points in a fluid seeded with tracer particles. The system may include at least two cameras positioned to view the fluid seeded with tracer particles. The two cameras may be positioned approximately perpendicular to one another to provide two, two-dimensional views of the tracer particles seeded in the fluid. A coordinate system for each camera may be defined based on a world coordinate system. A two-dimensional view of the fluid seeded with the tracer particles may be captured for each camera as a sequence of image frames.

The captured image frames may be processed to remove noise using time-averaged background subtraction with outlier rejection and spike-removal filtering. The system may stereo match particle tracks in the filtered image frames for each camera view and determine three dimensional coordinates of tracer particle tracks. The particle tracking may include using a neural net with simulated annealing to arrive at globally optimal assignments of tracks. The system may further calculate velocities at a plurality of points in the fluid responsive to the three dimensional coordinates of the tracer particle tracks and known time durations between image frames.

An exemplary embodiment of the system may further include calibrating the cameras using a calibration grid. For camera views of the calibration grid that are missing calibration points from the grid, the system may be operative to perform warping transformations which are used to estimate the location of missing points on a calibration grid. The calibration of the cameras may then proceed responsive to both actual and estimated calibration grid points.

BRIEF DESCRIPTION OF DRAWINGS

FIG. 13 shows a table of example input data sets for three dimensional coordinates of tracer particles.

FIG. 14 shows a table of example output data sets for three dimensional coordinates of tracer particles for three frame particle tracks.

BEST MODES FOR CARRYING OUT INVENTION

Figure 5:
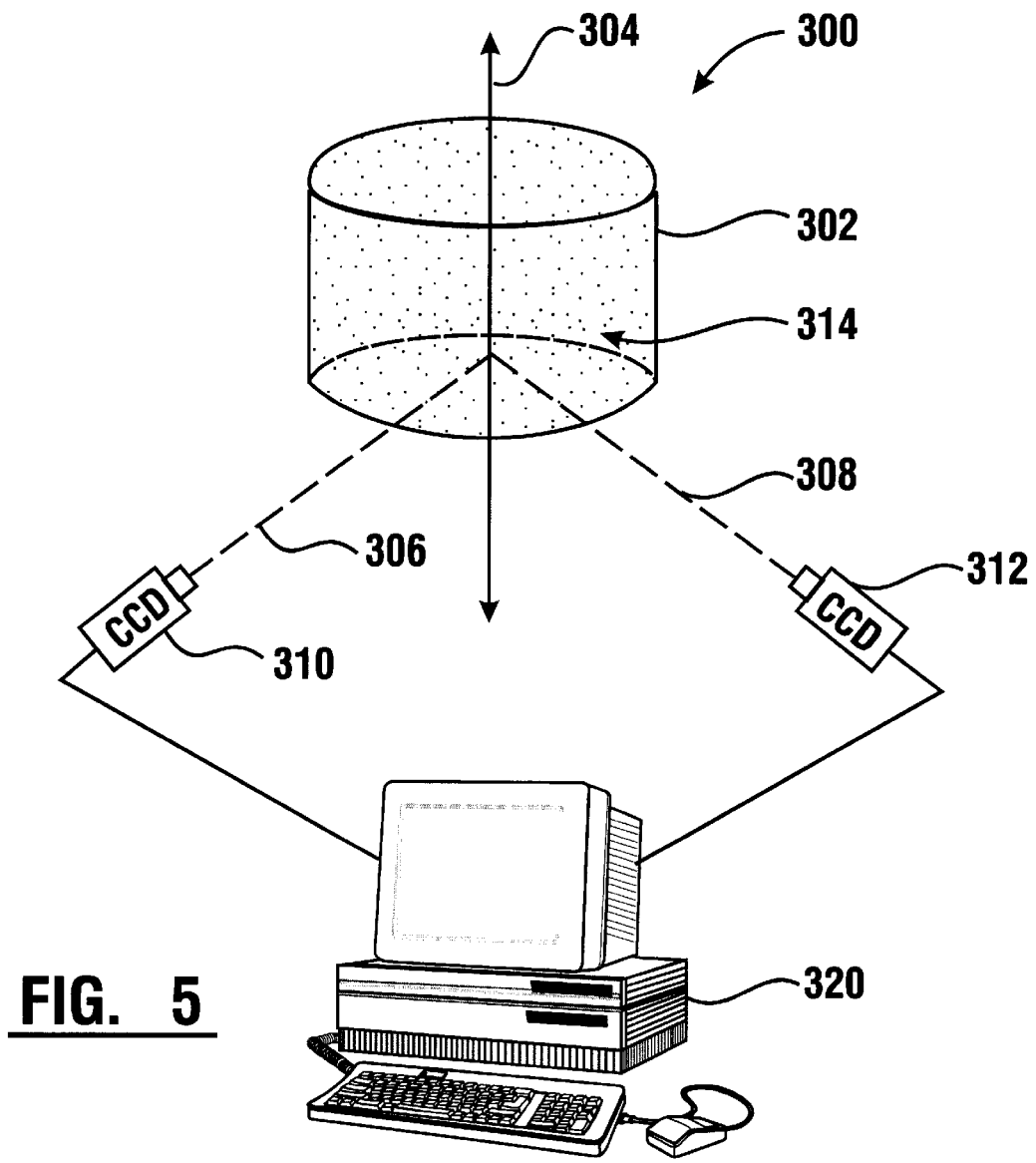
FIG. 5 is a schematic illustration of an exemplary embodiment of a system for performing stereo imaging velocimetry.

Referring now to the drawings and particularly to FIG. 5, an exemplary embodiment of an experimental chamber 300 which may be used to measure fluid flows is shown. However, it is to be understood that in other fluid flow experiments of which exemplary embodiments of the following described methods may be used, the size and shape of the chambers and configuration of the fluid flow may be different. For example experiments may include a fluid flowing through a conduit, a fluid flowing across a surface or a fluid having motion within a set fluid volume.

In this described exemplary embodiment, the experimental chamber 300 includes a cylinder 302 with a three inch diameter. The cylindrical axis 304 of the cylinder may be oriented perpendicularly to the plane defined by the focal axises 306, 308 of two cameras 310, 312. The cameras may be oriented approximately perpendicular to one another. Also, the cameras may be connected to a computer 320 or other device which is operatively programed to process the image frames captured from the cameras. In the described exemplary embodiment, the cylinder 302 may be filled with water or other fluids including either liquids or gases and placed in a plexiglass cube also filled with a fluid to reduce refraction of light at the cylinder walls.

The cylinder may be seeded with tracer particles 314. The type of tracer particles used may depend on the flow media and the measurement conditions such that the seed material does not alter the flow field conditions being measured. Some typical tracer particles may include but are not limited to alumina oxide, latex particles, polystyrene, microspheres, and the like. In the example shown in FIG. 5, 300 micron-diameter, polystyrene tracer particles may be used with an average image diameter which corresponds to about 3.2 pixels with respect to the image frames captured of the particles by the cameras.

Figure 1:
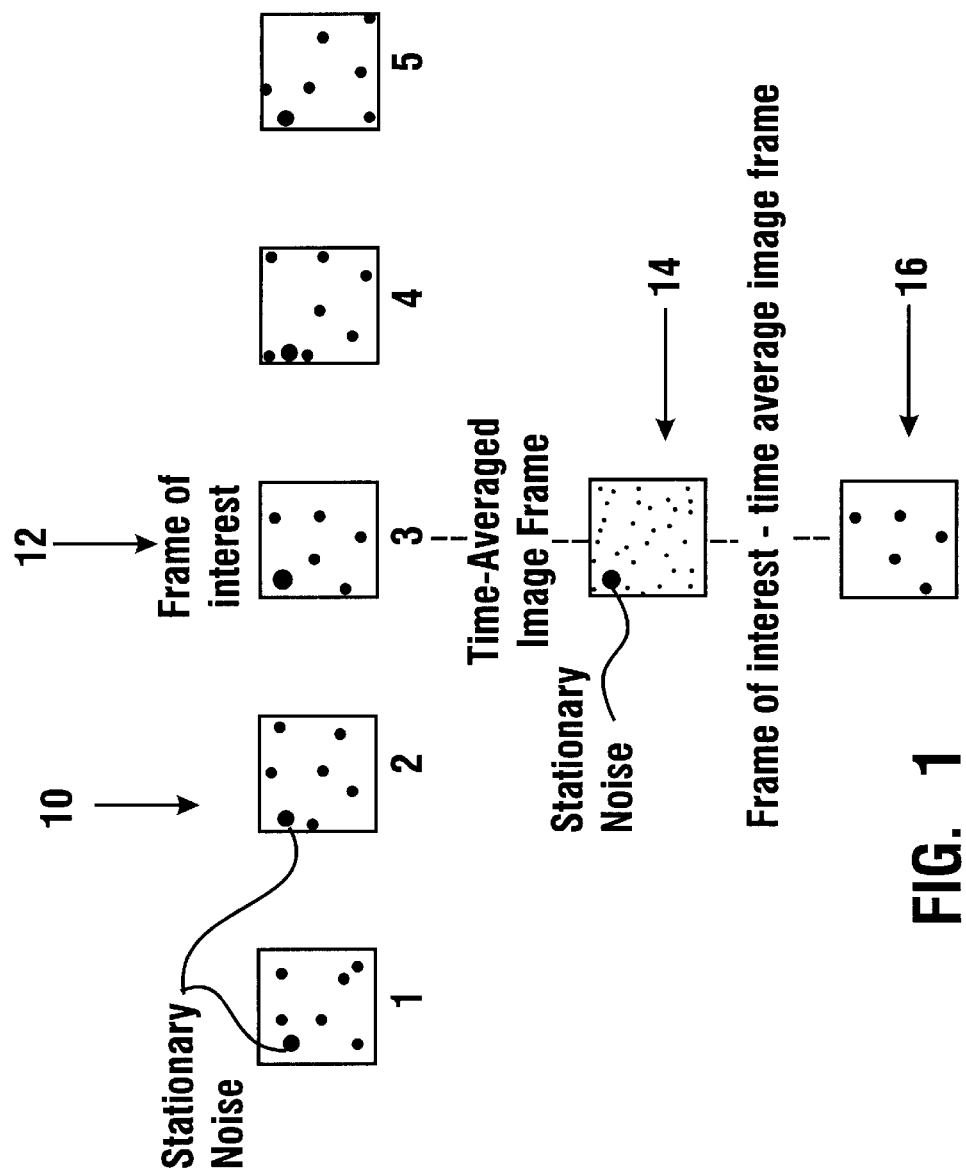
FIG. 1 is a schematic illustration of a method of filtering images of tracer particles using simple-background subtraction.
Figure 2:
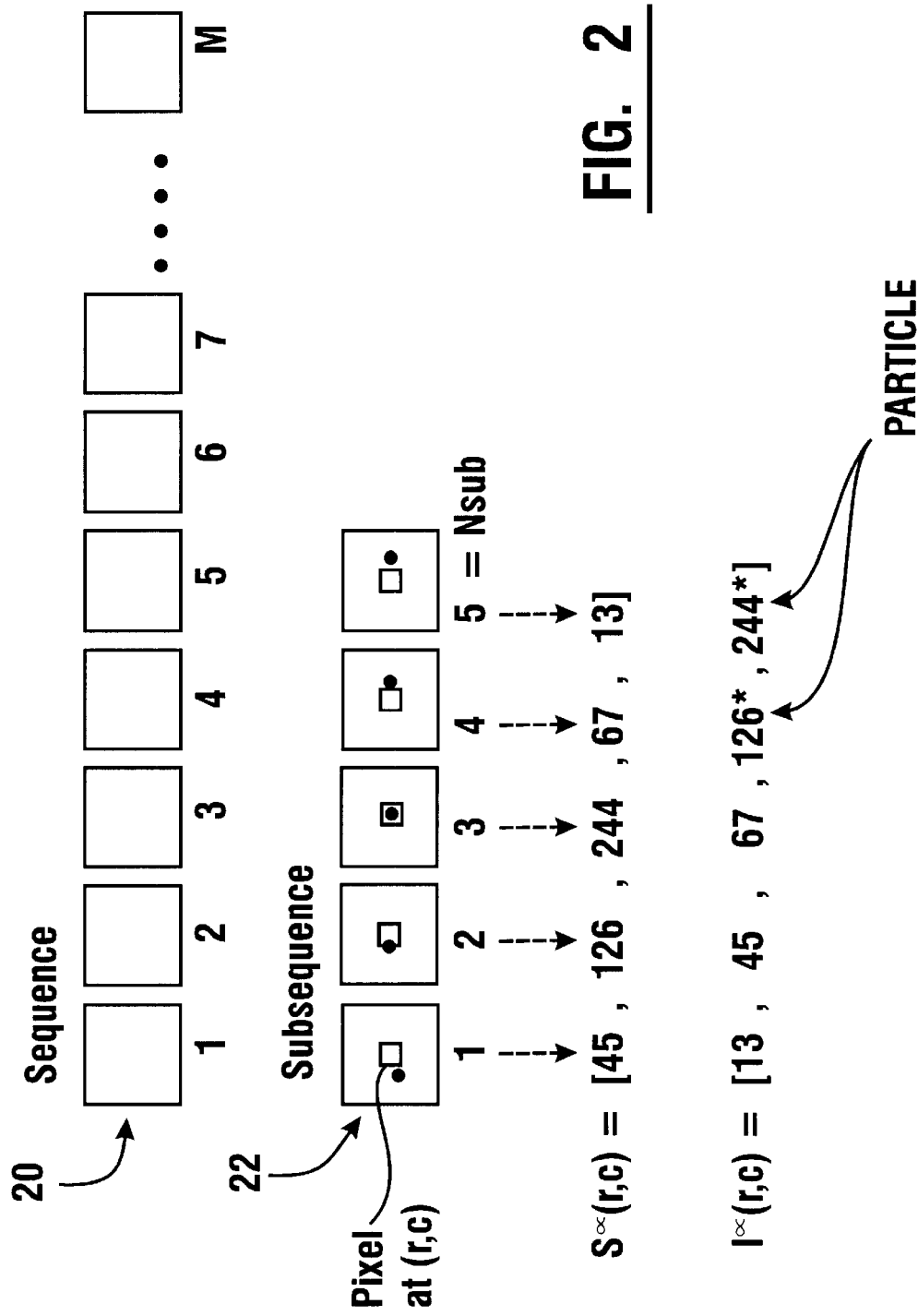
FIG. 2 is further a schematic illustration of a method of filtering images of tracer particles using simple-background subtraction.
Figure 3:
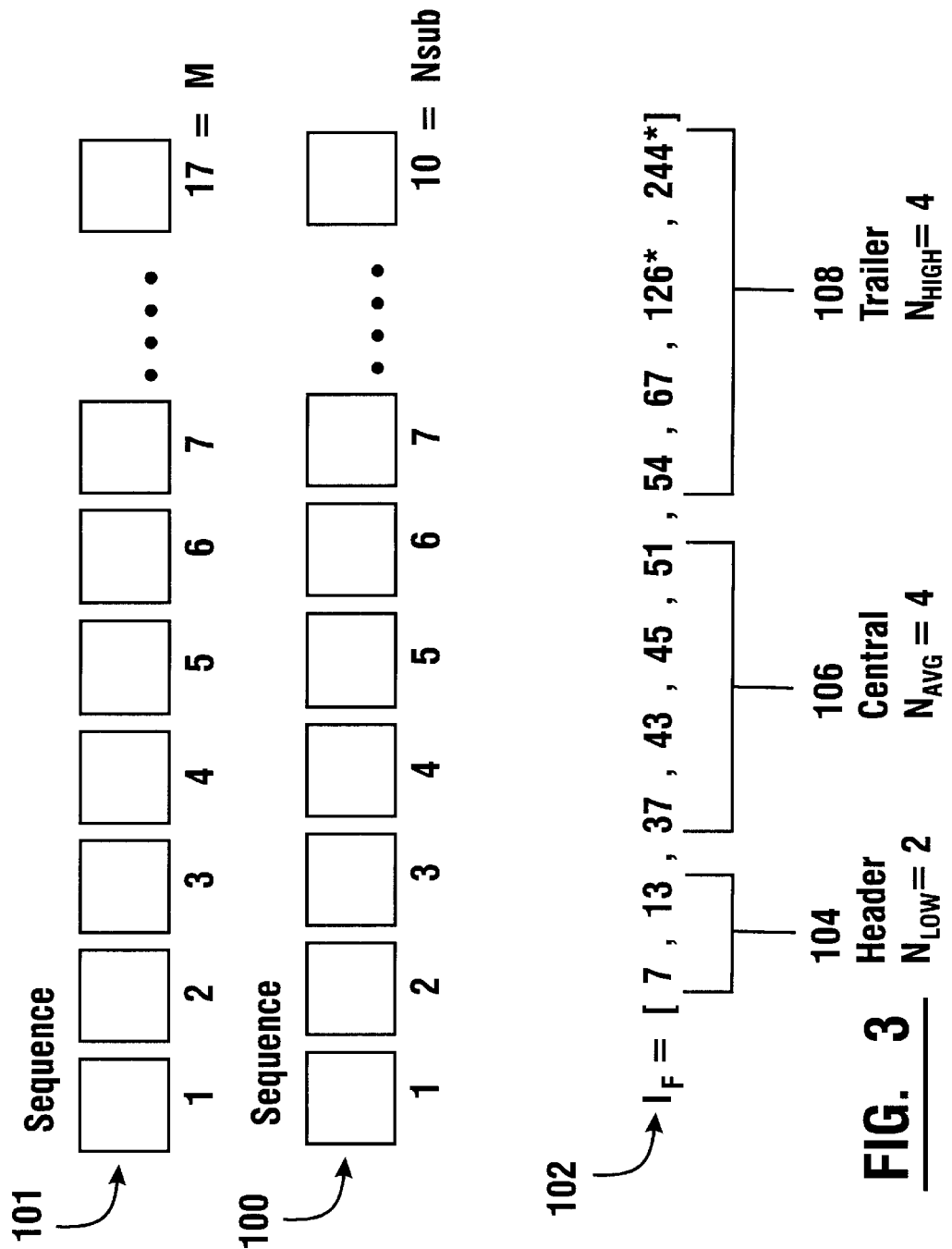
FIG. 3 is a schematic illustration of an exemplary embodiment of a method of filtering images of tracer particles using time-averaged background subtraction with outlier rejection.

In an exemplary embodiment a plurality of successive frames may be captured with the cameras for a given run of the experiment. For example as shown in FIG. 3, a given sequence of frames 101 may include a total of seventeen frames. The exemplary embodiment may include a method of filtering the frames which includes selecting a first subsequence 100 of frames from the beginning of the sequence 101. A frame of interest selected from the first subsequence may then be processed according to a filtering method described below which includes time-averaged background subtraction with outlier rejection and/or spike-removal filtering. A second subsequence may then be selected which is offset from the first subsequence, and the corresponding next frame of interests may be processed according to the filtering method described below. The processing of the frames may continue until the end of the sequence is reached.

The processed frames from the two cameras may then be stereo matched to obtain three dimensional locations of the particles as a function of time. As used herein stereo matching consists of determining which of the many particles in a pair of synchronized images from the two cameras represents the same particle image from different perspectives. From this data three component velocities of the particles can be calculated and a full-field, quantitative, three-dimensional map of the velocities of the fluid may be obtained. Examples of stereo matching calculations are found in U.S. Pat. No. 5,905,568 which is incorporated herein by reference in its entirety.

To improve the accuracy of resolving particle tracks, the exemplary embodiment includes a method of processing or filtering the subsequence of image frames using time-averaged background image subtraction with outlier rejection. In an exemplary embodiment of the stereo imaging velocimetry system, the computer may include means for processing the image frames which corresponds to software and/or hardware which is operatively programmed to carry out this method of processing.

In an exemplary embodiment of time-averaged background image subtraction with outlier rejection, intensity values for a specific pixel of the subsequence 100 is selected and placed into an order from lowest to highest values. The resulting ordered subsequence 102 for the specific pixel may be divided into different sets which include: a throw-away 'header' portion 104 at the low end ordered subsequence; a central portion 106 of the ordered subsequence which is retained for averaging, and a throw-away 'trailer' portion 108 at the high end of the ordered subsequence. Here $N_{LOW}$ refers to the length of the throw-away header portion 104. $N_{AVG}$ refers to the length of the central portion 106. $N_{HIGH}$ refers to the length of a throw-away trailer portion 108. $N_{SUB}$ refers to the length of the entire subsequence and such will equal the total of $N_{LOW}$, $N_{AVG}$, and $N_{HIGH}$. In the example shown in FIG. 3, $N_{SUB}$ is 10 frames, $N_{LOW}$ is 2 frames, $N_{AVG}$ is 4 frames, and $N_{HIGH}$ is four frames. In other exemplary embodiments other lengths of the subsequence and the portions of the subsequence may be chosen depending on the characteristics of the experiment being performed.

The introduction of disposable 'header' and 'trailer' portions may be used to perform a form of alpha-trimmed mean filtering of the ordered subsequence of grayscale values at each given pixel over the time of the subsequence. However, in this described example, the two tails of the subsequence may not be drawn from the same distribution.

The following examples illustrate the effectiveness of this approach for the fast and slow particles discussed previously in the Background Portion. In a first example of the exemplary embodiment, a subsequence showing a relatively fast moving particle (FIG. 3) is processed. Equation 7 shows the unprocessed ordered subsequence of intensity values (denoted as $I_F$) for the specific pixel which is illuminated by the passing particle. The ordered subsequence shown in Equation 7 includes the intensity values from the corresponding shorter subsequence shown in Equation 1.

$$I_F=[7, 13, 37, 43, 45, 51, 54, 67, *126, *244] \quad [7]$$

The intensity values marked with an "*" correspond to the fast moving particle. Here the exemplary embodiment of the method includes averaging only a subset of the subsequence of pixels which corresponds to the $N_{avg}$ pixels (37, 43, 45, 51) from the central portion of the subsequence. In this example the average of the central portion of pixel values is 44. Equation 8 shows an example of a processed ordered subsequence of intensity values (denoted as $I2_F$) which corresponds to the unprocessed ordered subsequence $I_F$.

$$I2_F=\max\{I_F-\text{Average}(I_F), 0\}=[0, 0, 0, 0, 1, 7, 10, 23, *82, *200] \quad [8]$$

Here the intensity values for $I2_F$ are obtained from $I_F$ by first subtracting out the time-averaged sequence value of the central portion, and second setting negative values to zero. In this example the processed background pixel values (values 0, 0, 0, 0, 1, 7, 10, 23) are significantly smaller than those marked with an asterisk (values 82, 200) which indicate that a particle is present.

In a second example, a subsequence showing a slower moving particle which is not as well lit is processed. Such a particle for example may be moving towards the camera along the sides of the experimental chamber. Equation 9 shows an example of the unprocessed ordered subsequence of intensity values (denoted as $I_S$) for a specific pixel which is illuminated by the relatively slower particle. The ordered subsequence shown in Equation 9 includes the intensity values from the corresponding shorter subsequence shown in Equation 3.

$$I_S=[7, 13, 37, 43, 51, 70, *120, *143, *168, *176] \quad [9]$$

The intensity values marked with an "*" correspond to the slow moving particle. Here the exemplary embodiment of the method includes averaging the subset of pixels (37, 43, 51, 70) from the central portion of the subsequence. In this example the average of the central portion of pixel values is 50. Equation 10 shows an example of a processed ordered subsequence of intensity values (denoted as $I2_S$) which corresponds to the unprocessed ordered subsequence $I_S$.

$$I2_S = \max\{I_S - \text{Average}(I_S), 0\} \quad [10]$$
$$= [0, 0, 0, 0, 1, 20, *70, *93, *118, *126]$$

The intensity values for $I2_S$ may be obtained from $I_S$ by first subtracting out the time-averaged sequence value of the central portion, and second setting negative values to zero. As in the previously example of the fast moving particle, the background pixel values (values 0, 0, 0, 0, 1 20) are significantly smaller than those marked with an asterisk (values 70, 93, 118, 126) which indicate that a particle is present.

Equation 11 shows an example of the unprocessed ordered subsequence of intensity values (denoted as $I_N$) for a specific pixel which experiences only stationery noise during the subsequence of interest. The ordered subsequence shown in Equation 11 includes the intensity values from the corresponding shorter subsequence of stationery noise shown in Equation 5.

$$I_N=[6, 13, 28, 32, 45, 47, 51, 53, 56, 67] \quad [11]$$

Here, no intensity values are marked with an "*" as none of the values corresponds to a moving particle. The average of the central portion of intensity values (28, 32, 45, 47) is 35. Equation 12 shows an example of a processed ordered subsequence of intensity values (denoted as $I2_N$) which corresponds to the unprocessed ordered subsequence $I_N$.

$$I2_N = \max\{I_N - \text{Average}(I_N), 0\} \quad [12]$$
$$= [0, 0, 0, 0, 7, 9, 13, 15, 18, 29]$$

As in the previous examples, the intensity values for $I2_N$ are obtained from $I_N$ by first subtracting out the time-averaged sequence value of the central portion, and second setting negative values to zero.

In the three examples corresponding to a fast particle, slow particle, and stationary noise, a significance threshold value may be applied to the processed ordered subsequence ($I2_F$, $I2_S$, $I2_N$). As used herein applying a significance threshold corresponds to setting all values below the threshold value to zero (black) while leaving all values above the threshold unchanged. As discussed in the Background Art section, no single significance threshold could be used to accurately identify actual particles from background noise for all three examples described. In contrast with the examples from the exemplary embodiment, a significance threshold value between 30 and 65 may correctly identify all of the frames out of all of the cases illustrated which correspond to actual particles.

In the exemplary embodiment the described filtering method includes performing the above described time-averaged background subtraction with outlier rejection for a plurality of pixels included in each frame of interest of the sequence of image frames captured during the run of the experiment.

Figure 4:
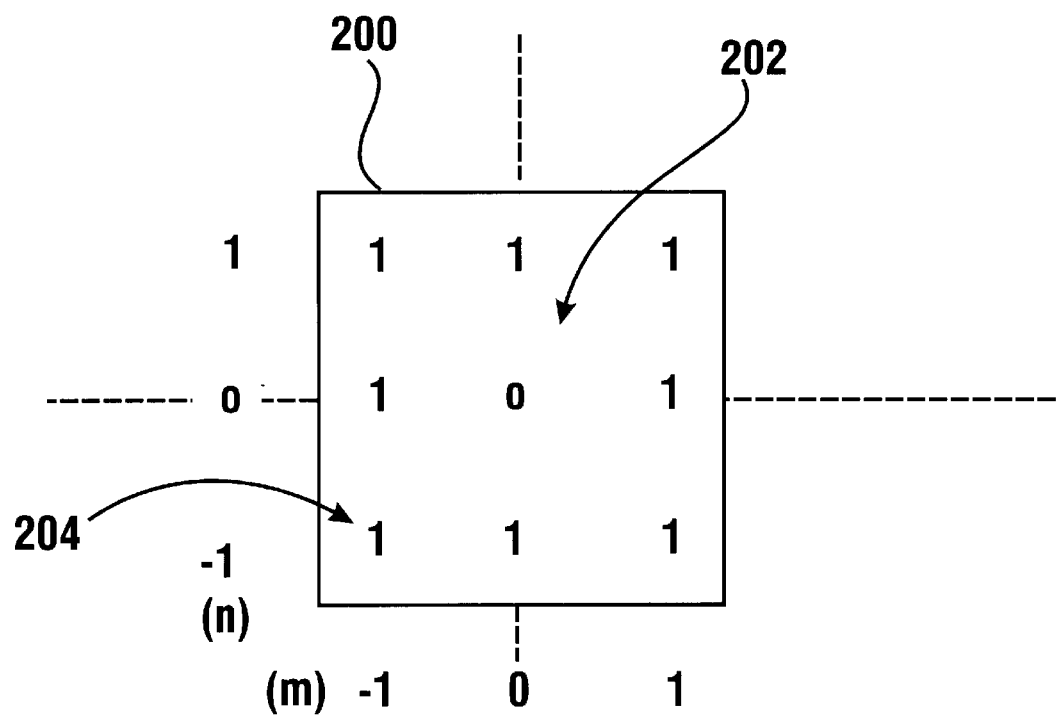
FIG. 4 is a schematic illustration of an exemplary embodiment of a spike-removal filter matrix.

Experimental results have shown that residual noise in the form of scattered glint may persist after processing the sequence of image frames using the previously described method of time-averaged background subtraction with outlier rejection. Such scattered glint may be concentrated in former glare spots. To remove this noise, the exemplary embodiment of the described filtering method may include applying a filter which is tailored to this form of noise. An example of such a filter 200 is shown in FIG. 4. The filter 200 corresponds to a spike-removal filter comprised of a 3×3 matrix with a deleted (zero-valued) center and surrounding values of 1.

In an exemplary embodiment of the stereo imaging velocimetry system, the computer may include means for processing the image frames which corresponds to software and/or hardware which is operatively programmed to perform this method of spike-removal filtering. The filter may be applied to the pixels of a frame according to a convolution operation represented by Equations 13 and 14. Using this filter, if a pixel is in the vicinity of a particle then its gray-scale value is unaltered, otherwise it is set to zero.

$$r(i,j) = \Sigma\Sigma f(m,n) * g(i+m,j+n) * H(g(i+m,j+n) - 1_1) \quad [13]$$

$$m,n \in \{-1, 0, 1\}$$

$$h(i,j) = g(i,j) * H(r(i,j) - 1_2) \quad [14]$$

Equation 13 corresponds to a convolution step and outputs a value denoted by $r(i,j)$, for a pixel at the coordinates $(i,j)$ of a frame. The original gray-scale pixel value of the pixel located at $(i,j)$ is denoted by $g(x,y)$. In Equation 13, the term $1_1$ corresponds to a significance threshold for each pixel in the summation. The term $H(x)$ equals a value of zero if x is less than zero, otherwise the term $H(x)$ equals a value of one.

The term $f(m,n)$ equals the value of the filter (FIG. 4) at the coordinate position $(m, n)$ where m and n are selected from the set of $\{-1, 0, 1\}$. For example, as shown in FIG. 4, the center of the filter 202 has a value of zero and corresponds to the $(m, n)$ coordinates of $(0,0)$. The lower left value 204 of the filter has a value of one and corresponds to the $(m, n)$ coordinate position of $(-1, -1)$.

Equation 14 produces the resulting filtered pixel value denoted by $h(i,j)$ using the output $r(i,j)$ of Equation 13. In Equation 14, the term $1_2$ corresponds to the output threshold for the filter. This filter is operative to search for a neighborhood which is proximal to a particle. Absent a particle, $r(i,j)$ will be small. Thus expression $r(i,j)-1_2$ will be less then zero if no particle is in the neighborhood of $(i,j)$ and the expression $r(i,j)-1_2$ will be greater than or equal to zero if a particle is in the neighborhood of $(i,j)$. Thus in Equation 14 when a particle is in the neighborhood of $(i,j)$, the $H(\ )$ term will be unity and the resulting $h(i,j)$ pixel value will be identical to the original pixel value $g(i,j)$. When no particle is in the neighborhood of $(i,j)$, the $H(\ )$ term will be zero which will result in $h(i,j)$ being set to zero.

The value of $g(i,j)$ is excluded from the summation in Equation 13 by setting the center of the filter $f(0, 0)$, to zero (FIG. 4). This tends to suppress spikes. The $H(\ )$ term in Equation 13 corresponds to a significance test for each term in the summation. If we are in a glare spot on the image then the $H(\ )$ term is operative to prevent weak gray-scale values from summing to a large, significant value. Using this described exemplary embodiment of a spike-removal filter, a gray-scale value of a pixel will be unaltered for pixels in the vicinity of a particle, while the gray-scale value of a pixel will be set to zero for pixels which are not in the vicinity of a particle.

In this described exemplary embodiment, the method may include providing a spike-removal filter which has a size that corresponds to the average pixel size of the particles in the experiment. In the described example embodiment shown in FIG. 5, the average particle diameter may be 3.2 pixels, thus a 3×3 filter (FIG. 4) may be chosen. In other experiments, other filter sizes and configurations may be provided depending on the average diameters of the seed particles.

With the configuration of the experiment described above, a value of 70 for $1_1$ in Equation 13 (where 255 corresponds to white) has been found to be a suitable lower bound for particle intensity and a value of 250 for $1_2$ in Equation 14 has been found to be suitable to accurately remove residual noise. However, it is to be understood that in other configurations of experiments other values for $1_1$ and $1_2$ may be chosen depending on the illumination and noise characteristics of the experiment.

In experiments where there is limited space to position two cameras, the distortion of the images from the cameras may be so severe that edges and objects may be cut off. An exemplary embodiment may include a method for reducing the effects of these distortions using a third degree geometric warping transformation. Such a transformation may be used to approximate missing calibration data, thereby allowing calibration of the designated area in its entirety for a camera. In the exemplary embodiment of the stereo imaging velocimetry system, the computer may include means for calibrating the cameras using a calibration grid. Such means may corresponds to software and/or hardware which is operatively programmed to perform these warping transformations.

Figure 7:
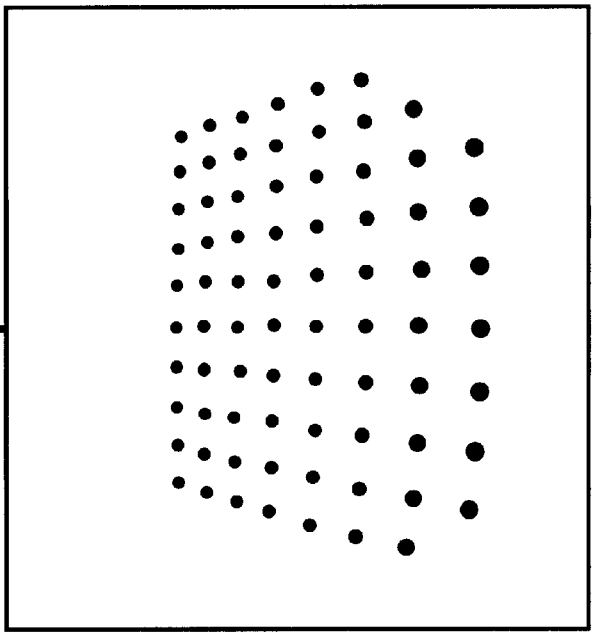
FIG. 7 is a schematic representation of the camera calibration grid illustrating a second camera view.
Figure 6:
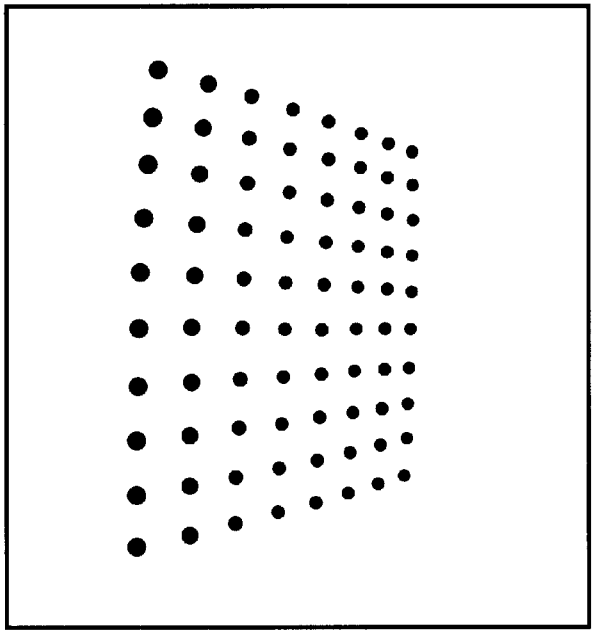
FIG. 6 is a schematic representation of the camera calibration grid illustrating a first camera view.

In experiments involving image processing, the cameras involved in the experiment should be calibrated to remove nonlinearities produced by the camera/lens systems. U.S. Pat. No. 5,905,568 which is incorporated by reference herein in its entirety includes examples of calibration techniques for stereo imaging velocimetry experiments. Calibration routines may be performed using a rectangular grid of data points. Unfortunately, when points are cut out of one image due to a restricted camera field of view, the entire calibration area may suffer. FIGS. 6 and 7 show camera calibration images from an example experiment. The images are taken from the right and left cameras for a rectangular 8×10 grid of calibration points. In each of these images, the camera lenses contain significant nonlinear distortion. In the prior art, calibration techniques may require removing the first and last two columns from the grid since complete data was not available for them. This restricts the entire calibrated area, and decreases the effectiveness of the calibration.

In an exemplary embodiment, a third degree warping transformation may be used to approximate the location of the missing calibration points in the grid which allows accurate calibration of the entire area. The warp algorithm may use a mapping function from a set of source control points to a set of target points allowing the image to be geometrically altered. In the exemplary embodiment, at least ten source control points may be used for a third degree warp. Such a third degree warp may be operative to account for linear transformations such as scaling, rotation and translation, as well as nonlinear distortion from sources such as pincushion and barrel lens aberrations.

Equation 15 shows an example warping transform function for source-to-target mapping for a third order warp.

$$I(x, y) \rightarrow O(x', y') \quad [15]$$

where:

$x' = a_9 x^3 + a_8 y^3 + a_7 x^2 y + a_6 y^2 x + a_5 x^2 + a_4 y^2 + a_3 x + a_2 y + a_1 xy + a_0$ $y' = b_9 x^3 + b_8 y^3 + b_7 x^2 y + b_6 y^2 x + b_5 x^2 + b_4 y^2 + b_3 x + b_2 y + b_1 xy + b_0$

Here the coefficients $a_0$–$a_9$ and $b_0$–$b_9$ correspond to calibration coefficients. Also, x is the column index in pixels and y is the row index in pixels for a source control point. In addition, x' is the column index in pixels and y' is the row index in pixels for a target point.

Figure 8:
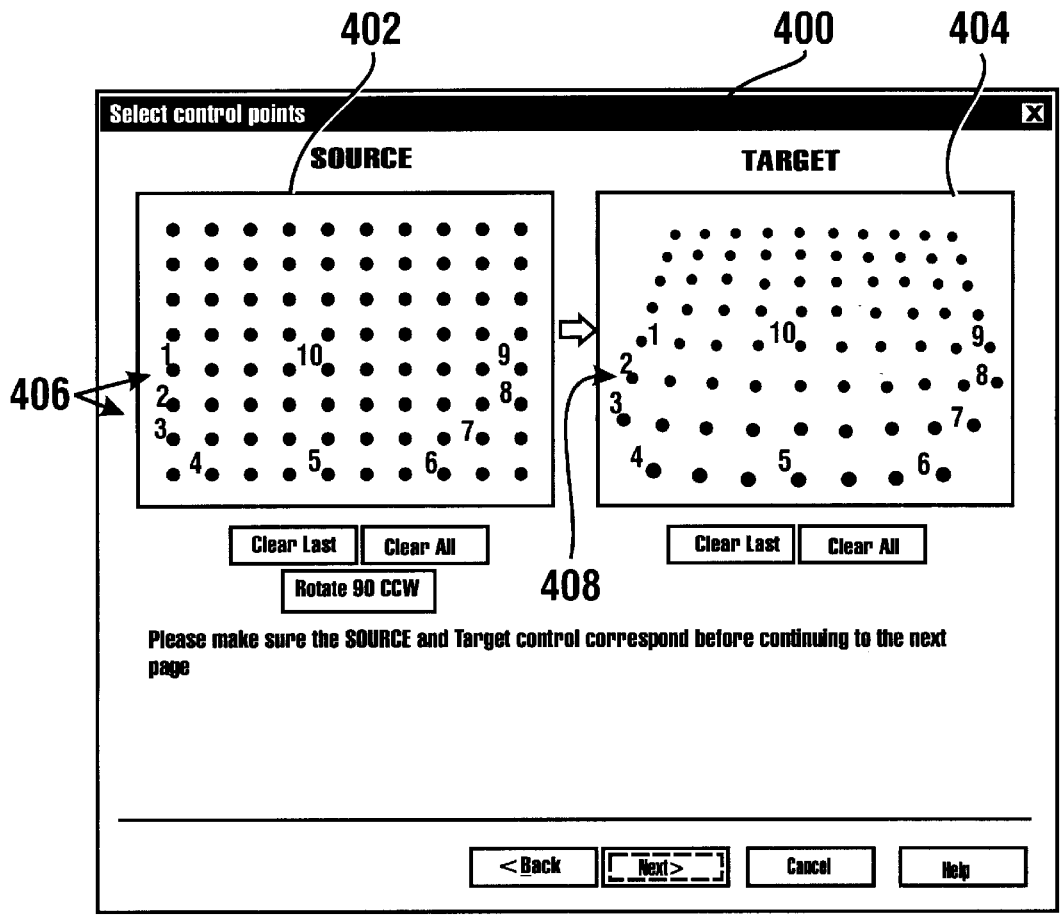
FIG. 8 shows a user interface application which is operative to perform warp transformation calculations for estimating the position of missing calibration points in a target image of a calibration grid.

FIG. 8 shows an exemplary embodiment of a user interface application 400 which is operative to perform a warping transformation for a target calibration grid which is missing calibration points. The user interface application 400 is operative to display a source grid 402 of source control points which corresponds to the 2D locations of the calibration points from a calibration grid. The user interface application 400 also is operative to display a target grid 404 with target points which correspond to the image of the calibration grid with missing points.

The exemplary embodiment of the user interface application 400 is operative to enable a user to selectively match source control points 206 with their corresponding target points 208. For the exemplary embodiment of the warping transform function shown in Equation 15, the user may selectively match ten points from each of the source and target grids 402, 404.

Figure 9:
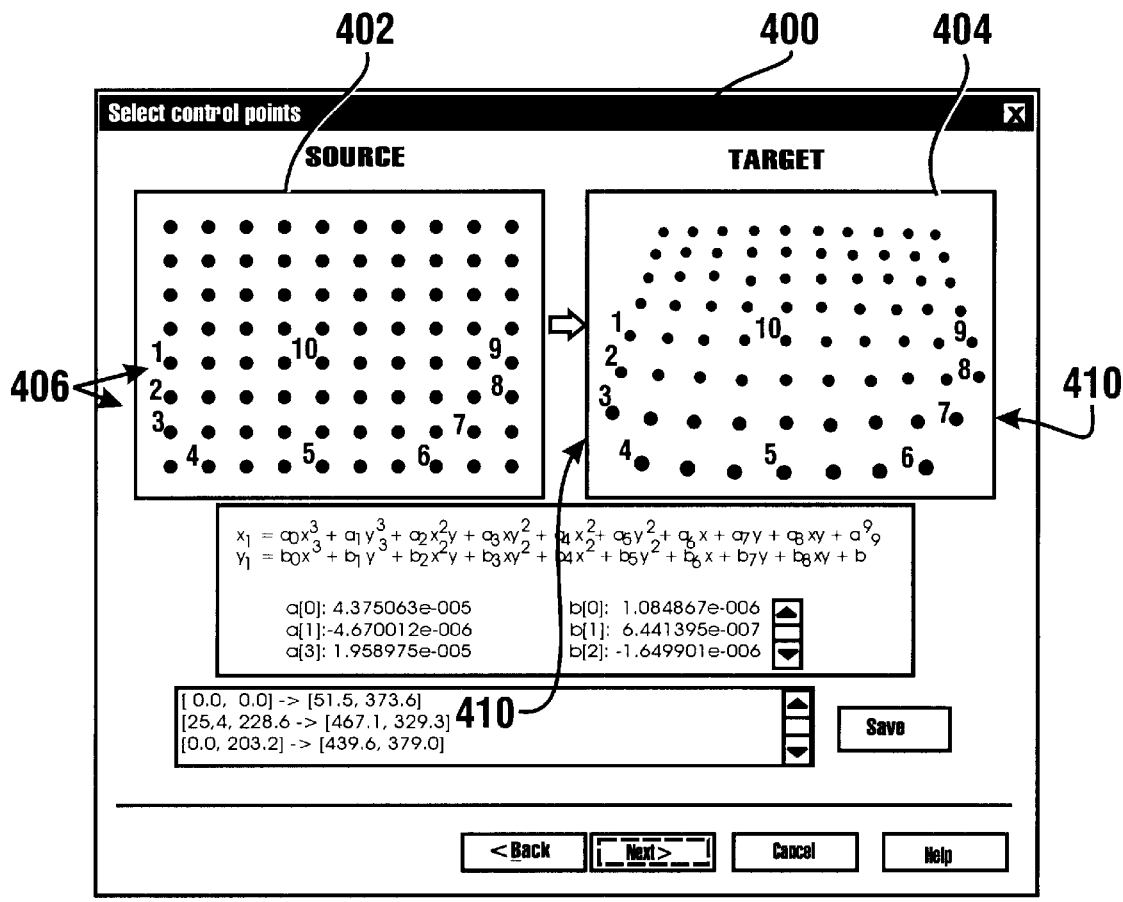
FIG. 9 shows the user interface application after missing calibration points have been determined for a target image of a calibration grid.

The exemplary embodiment of the user interface application 400 is operative to calculate the coefficients $a_0$–$a_9$ and $b_0$–$b_9$ using Equation 15 and the (x, y) and (x', y') coordinates of the ten sets of source and target points selected by the user. Once the coefficients have been calculated the exemplary embodiment of the user interface application 400 is operative to calculate (x',y') coordinates for any points in the target grid 404 which are missing when compared to the source grid 402. As shown in FIG. 9, the user interface may be operative to graphically display the positions of the missing target points 410 in the target calibration grid. The modified target grid may be saved or other wise outputted to the calibration software of the system by the user interface application 400 for use with calibrating the cameras.

Although some accuracy may be lost when approximating the location of missing calibration points in the target image. This small loss in accuracy may more than be made up for by the ability to use all of the points on the target image. The result is a complete calibration grid that includes the entire field of view, which may increase the yield and accuracy of the calibration and experiment.

As discussed previously, once image frames are processed to remove noise, the frames may further be processed to identify particle tracks for individual particles moving in the fluid. From these particle tracks the three dimensional velocity components across the fluid can be determined. To determine particle tracks from the image frames, an exemplary embodiment may include a method of tracking particles which includes a neural net with simulated annealing to arrive at globally optimal assignments of tracks. In the exemplary embodiment of the stereo imaging velocimetry system, the computer may include means for identifying particle tracks for common particles in multiple image frames for each camera. Such means may correspond to software and/or hardware which is operatively programmed to perform the particle tracking method.

The neural net may be 'guided' both by the minimization of the search space through the use of limiting assumptions about valid tracks and by an interventionist strategy which seeks to avoid high-energy intermediate states by eliminating overlapping tracks that can trap the net in a local minimum. A stochastic search algorithm may be used to further reduce the chance of being trapped in an energy well. Global optimization may be achieved by minimizing an objective function that includes both track smoothness and particle-image utilization parameters.

In an exemplary embodiment particle tracking may begin by randomly selecting from the database complete sets of first guesses as to possible track assignments for particles in the image frames. These first guesses may be referred to as parents. These early parents are often poor solutions which need to be optimized. Optimization may be performed by randomly selecting one or more tracks within a parent, changing the track(s), and calling the resultant modified solution a child. Several children per parent are generated to create a family. Families evolve when a new generation of parents is chosen from among the existing family members. The system error (the objective function to be minimized) may be computed for each child and, in general, the member of a given family with the lowest system error may be chosen as the new parent.

These steps may be repeated over many generations until an acceptable solution is found or until the families stop evolving. The latter can occur because the best solution was found, or, more likely, because a local minimum in the system error, also called an energy well, was found. System error is a relative measure of the acceptability of a given state.

In an ideal experiment, every particle in every frame would be assigned to a single track. However, in practice it is often not possible to assign every particle to a single track. In the exemplary embodiment the limitation that not all particles will be assigned to a single track is quantified as a usage error.

Tracks may be quantified by both how straight they are (an assumption of zero acceleration) and by how smooth they are (an assumption of constant acceleration). An exemplary embodiment is operative to calculate the relative track straightness and track smoothness of actually identified particle tracks with respect to ideal estimates of the trajectories for the particles in the tracks. The results of such calculations for each track may be quantified as a track straightness error or a track smoothness error.

In the exemplary embodiment the usage error, and the track straightness or smoothness error are used to determine the system error for each generation of particle track solution. An acceptable solution of optimized particle tracks may be selected when the system error reaches a local minimum for that solution. In an exemplary embodiment system error may be calculated according to Equation 16.

$$\text{system\_error} = \text{track\_error} + \text{usageCoeff} * \text{particle\_usage\_error.} \quad [16]$$

Here the term track_error corresponds to either the track straightness error or track smoothness error, depending on which is smaller for a given track.

Figure 11:
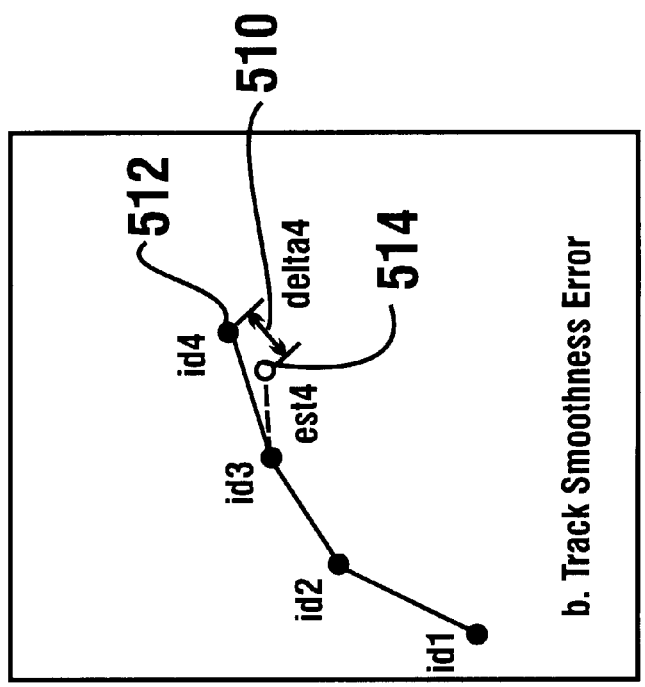
FIG. 11 is a schematic illustration of a method for calculating a track smoothness error.
Figure 10:
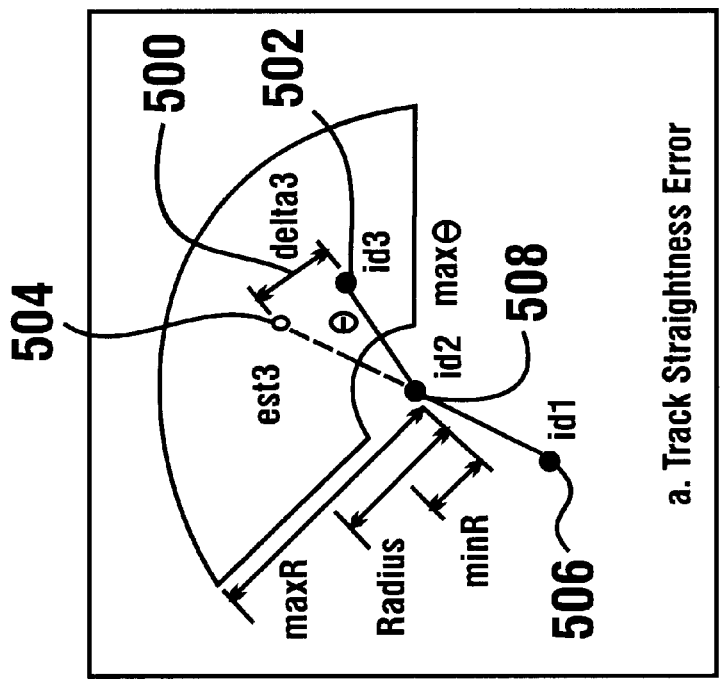
FIG. 10 is a schematic illustration of a method for calculating a track straightness error.

As shown in FIG. 10, a track straightness error 500 may be determined by calculating the distance between the actual position 502 of a particle in a third frame and the estimated position 504 of the particle in the third frame based on particle positions 506, 508 in the preceding two frames (assuming zero acceleration). As shown in FIG. 11, a track smoothness error 510 may be determined by calculating the distance between the actual position 512 of a particle in a fourth frame and the estimated position 514 of the particle in the fourth frame calculated by using a pair of parametric quadratic equations in the x and y directions and the particle positions 516, 518, 520 in the proceeding three frames (assuming constant acceleration).

As described previously, the system error which may be derived from the usage error and the track error may be continuously calculated for each iteration of the children and parent tracks until the best solutions have been found or at least until the system error reaches a minimum level.

Once two sets of two-dimensional tracks, one set from each of the two orthogonal views of the two cameras, have been identified, an exemplary embodiment is operative to determine a globally optimal solution for particle tracks by stereo-matching the two-dimensional tracks. U.S. Pat. No. 5,905,568 which is incorporated by reference herein in its entirety includes examples of stereo-matching methods which may be used to match tracks associated with each camera view to determine three dimensional coordinates for the tracer particle tracks. The exemplary embodiment of the stereo-matching method may further use a neural net tracking method as described previously to identify the best particle track solutions or at least identify solutions which correspond to a minimum system error. In the exemplary embodiment of the stereo imaging velocimetry system, the computer may include means for stereo matching the particle tracks. Such means may correspond to software and/or hardware which is operatively programmed to perform a stereo-matching method.

Figure 12:
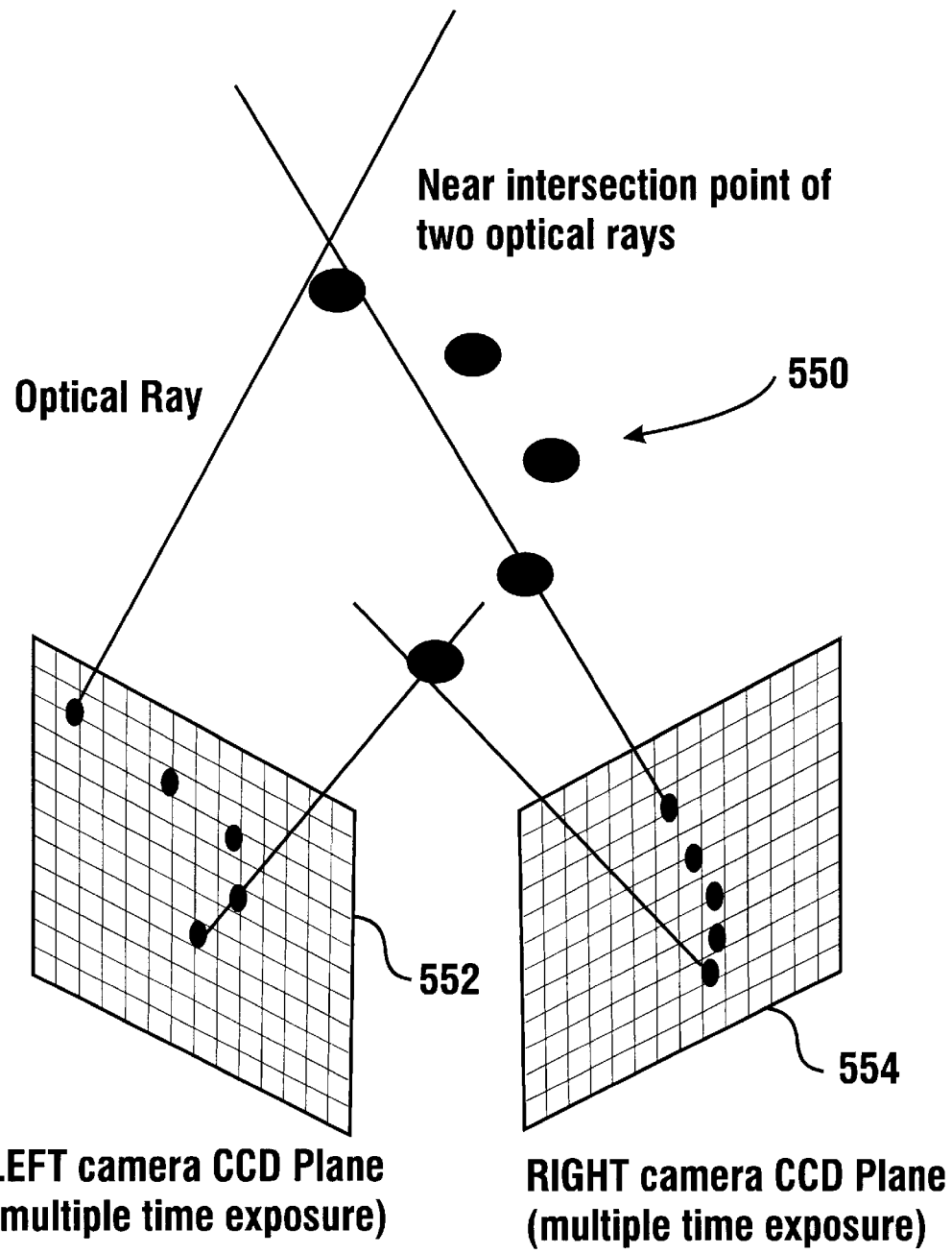
FIG. 12 is a schematic illustration of how a particle's information is employed to stereo match tracks.

FIG. 12, shows an example of stereo-matching of a track 550 that appears in the right and left orthogonal camera views 552, 554. In an exemplary embodiment, a system or optimization error may be calculated for each iteration which may be the sum of the squared vertical displacements (in pixels) between corresponding particle images, on a frame-by-frame basis, matching a given track from the left view with one in the right view. A threshold value may be chosen for the sum of the squared errors. Any pair of tracks having an error exceeding this value may be rejected. The output from this process may be used as an after-the-fact measure of how successful the tracking method may have been since ideally, tracks identified in one view should each match exactly with a unique track in the orthogonal view.

In an exemplary embodiment, a method of identifying particle tracks may further include a tracking algorithm which may be used to perform three-dimensional tracking of particles over three frames. The input to the tracking algorithm may be a plurality of input data sets which contain a plurality of coordinate triplets (X,Y,Z) each representing a point in three-dimensional real space of a particle. As discussed previously, the three dimensional coordinates of the tracer particles may be determined responsive to a stereo matching technique applied to the previously discussed filtered image frames.. As shown in FIG. 13, an input data set may correspond to a table 602 of XYZ coordinates where each line represents an image point of a particle in real world 3D coordinates. In an exemplary embodiment the input data sets may be text files which include XYZ coordinate data for individual particles.

Figure 15:
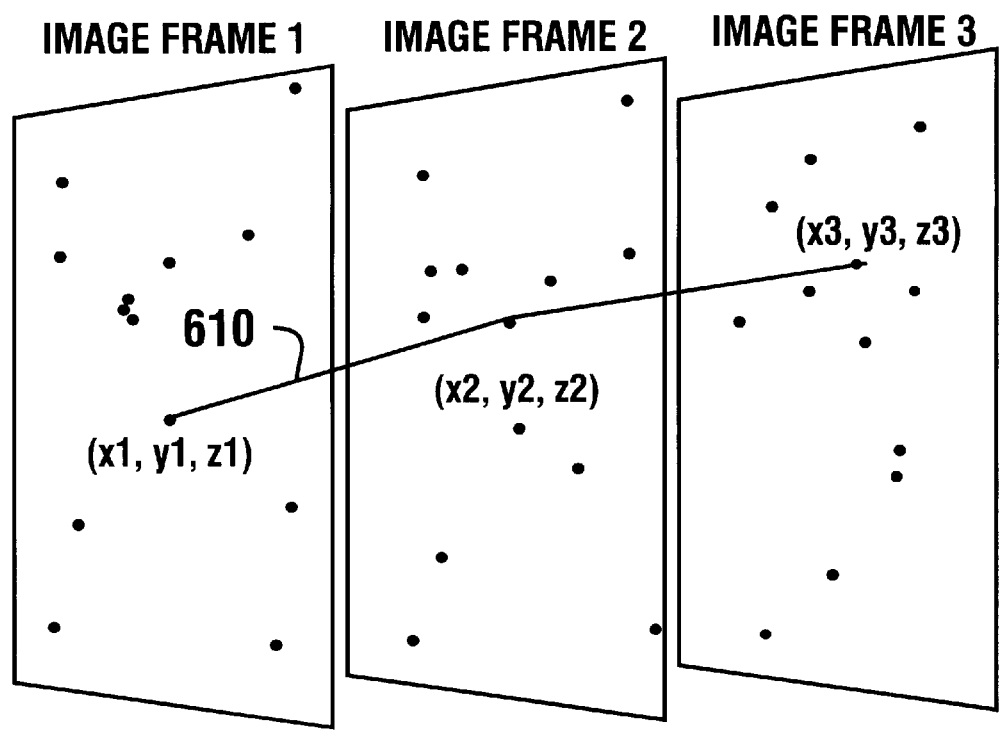
FIG. 15 is a schematic illustration of three frame images illustrating the manner in which potentially valid tracks are identified.

An output from the tracking algorithm may be a plurality of data sets containing three-dimensional track information. As shown in FIG. 14, an output data set may correspond to a table 604 of sets of XYZ coordinates, where each line represents a plurality of real world coordinate positions for a particle in a plurality of tracks. As shown in FIG. 15, each particle track 610 may be three frames long, thus as shown if FIG. 14, each line of the output data set may include three sets of particle positions. In an exemplary embodiment the output data sets may be saved as text files. The number of output data sets, such as text files which are produced may be two less than the sequence length since each track is three frames long.

In this described exemplary embodiment the previously described iterative techniques of quantifying system error responsive to a calculated usage error, track smoothness error and/or track straightness error may be used to identify the best solutions or least solutions that produce minimum system errors for the identified particle tracks.

As discussed previously, the time duration between each successive frame is determined by the frame capture rate of the camera system. With a CCD camera, for example, the time duration between successive frames may be ⅟30th of a second. Based on this known time duration and the coordinate data for particle tracks of common particles in successive frames, the velocities of the particles and hence the three dimensional velocities components of the fluid at a plurality of different points in the chamber may be calculated. In the exemplary embodiment of the stereo imaging velocimetry system, the computer may include means for calculating velocity for the plurality of points in the fluid. Such means for example may correspond to software and/or hardware which is operatively programmed to calculate velocities responsive to the three dimensional coordinates of the particle tracks and the known time durations between the image frames.

The exemplary embodiments of the methods described herein may be used to provide full-field, quantitative, three-dimensional map of any optically transparent fluid which is seeded with tracer particles. The described methods may be applicable to any fluid, air and gas flow experiment, biomedical applications observing cell growth and development, in-line process inspection, HVAC design, sports physics applications, high-speed imaging and color image analysis in two and three dimensions.

Thus the stereo imaging velocimetry system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing. any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. A method for measuring three-dimensional velocities at a plurality of points in a fluid, comprising the steps of:
    a) positioning at least two cameras to view a fluid with the cameras being approximately perpendicular to one another;
    b) capturing a plurality of image frames of the fluid seeded with tracer particles with each camera;
    c) filtering the image frames using time-averaged background subtraction with outlier rejection; and
    d) determining three dimensional coordinates of tracer particle tracks in the filtered image frames;
    e) calculating velocities at a plurality of points in the fluid responsive to the three dimensional coordinates of the tracer particle tracks and time durations between image frames.

2. The method according to claim 1, wherein step (d) further includes:
    f) determining two dimensional coordinates for the tracer particle tracks for the image frames for each camera responsive to the filtered image frames; and
    g) stereo matching the tracer particle tracks for corresponding image frames for each camera to determine the three dimension coordinates for the tracer particle tracks.

3. The method according to claim 1, wherein step (c) includes generating filtered image frames in which at least a portion of the pixels from the image frames with intensity values that correspond to background noise are set to values which correspond to the absence of a particle.

4. The method according to claim 1, wherein in the step (c) time-averaged background subtraction with outlier rejection includes:
    f) placing in order a plurality of intensity values for a common pixel present in a plurality of the image frames;
    g) selecting a subset of the plurality of intensity values from a central portion of the ordered plurality of intensity values;
    h) averaging the subset of the plurality of intensity values to produce an average intensity value for the subset; and
    i) reducing the values of the plurality of intensity values responsive to the average intensity value.

5. A method according to claim 4, wherein in the step (c) time-averaged background subtraction with outlier rejection further includes:
    j) generating filtered image frames in which those reduced values from the plurality of intensity values which are below a threshold value are set to at least one value which corresponds to the absence of a particle.

6. A method according to claim 5, wherein in step (j) the at least one value which corresponds to the absence of a particle equals an intensity value of zero.

7. A method according to claim 6, wherein in step (f) the threshold value is equal to or greater than zero.

8. A method according to claim 5, wherein in step (g) the subset of intensity values corresponds to intensity values from at least four image frames.

9. A method according to claim 5, wherein in the ordered plurality of intensity values in step (g) at least one intensity value is before the subset of intensity values and at least one intensity value is after the subset of intensity values.

10. The method according to claim 1, wherein step (c) includes applying a spike-removal filter to the image frames.

11. The method according to claim 10, wherein in step (c) applying a spike-removal filter to the image frames includes:
    f) performing a convolution operation responsive to the spike-removal filter in which each pixel of the image frames is set to zero when the pixel is not within the vicinity of at least one further pixel which corresponds to a particle.

12. The method according to claim 11, wherein in step (g) the spike-removal filter includes a 3×3 matrix with a zero value surrounded by values of 1.

13. The method according to claim 11, wherein prior to step (c) further comprising,
    g) determining the average diameter of the tracer particles captured on the image frames in units of pixels;
    h) selecting a matrix for the spike-removal filter which has a length and width that corresponds to the average diameter of the tracer particles in units of pixels.

14. The method according to claim 1, further comprising:
    f) imaging with each camera a calibration grid containing calibration points to produce a target calibration image frame of the calibration grid for each camera; and
    g) calibrating each camera responsive to the target calibration image taken by the respective camera.

15. The method according to claim 14, and further comprising
    h) matching sets of existing calibration points from the at least one target calibration image with their respective calibration points on a source calibration image, wherein the source calibration image corresponds to a generally undistorted flat view of the calibration grid;
    i) forming responsive to the matching sets of calibration points, a set of transformation functions which are operative to translate the coordinates for the calibration points of the source calibration image to their respective coordinates for the calibration points of the at least one target calibration image;
    j) deriving the coordinates of the at least one missing calibration point for the at least one target calibration image responsive to the set of transformation functions and the coordinates of at least one calibration point of the source calibration image which correspond to the at least one missing calibration point for the at least one target calibration image; and
wherein in step (g) the camera that imaged the at least one target calibration image is calibrated responsive to the coordinates of the existing calibration points and derived at least one missing calibration point for the at least one target calibration image.

16. The method according to claim 2, wherein step (f) includes
    h) associating tracer particles to a plurality of parent particle tracks;
    i) generating at least one alternative child particle track for each parent particle track;
    j) calculating a system error for each of the particle tracks, wherein the system error corresponds to a relative measure of the acceptability of the particle tracks;
    k) determining whether the child particle track has a lower system error than the parent particle track, wherein when the child particle track has a lower system error than the parent particle track, the child particle track becomes the parent particle track; and l) repeating steps (i) through (k) until the system error is minimized.

17. The method according to claim 16, wherein in step (j) the system error is a function of a particle usage and a track error, wherein the usage error corresponds to the amount of particles in the image frames which are not assigned to a single track, wherein the track error corresponds the relative deviation of the actual particle tracks from smoothly curved or straight particle tracks calculated from at least a portion of the particles which are assigned to the actual particle tracks.

18. The method according to claim 1, wherein prior to step (d) further comprising:

f) stereo matching two dimensional coordinates of the tracer particles for corresponding images frames for each camera to determine three dimension coordinates for the tracer particles;

g) determining the three dimensional coordinates of particle tracks for at least three consecutive image frames responsive to the three dimensional coordinates for the tracer particles.

19. A system for measuring three-dimensional velocities at a plurality of points in a fluid, comprising:

a chamber, wherein the chamber includes a fluid seeded with tracer particles;

at least two cameras positioned to view the fluid seeded with the tracer particles, wherein the at least two cameras being positioned approximately perpendicular to one another, wherein the at least two cameras are operative to provide a plurality of image frames which include views of the tracer particles seeded in the fluid;

at least one computer in operative connection with the at least two cameras, wherein the at least one computer is operatively programmed to filter the image frames using time-averaged background subtraction with outlier rejection, wherein the computer is further operatively programmed to determine three dimensional coordinates of tracer particle tracks in the filtered image frames and calculate responsive to three dimensional coordinates and time durations between the image frames, velocities at the plurality of points in the fluid.

20. The system according to claim 19, wherein the at least one computer is operatively programmed to determine two dimensional coordinates for tracer particle tracks responsive to the filtered image frames for each camera, and wherein the at least one computer is operatively programmed to stereo match the two dimensional coordinates for the tracer particle tracks for corresponding image frames for each camera to determine the three dimension coordinates of the tracer particle tracks.

21. The system according to claim 19, wherein the at least one computer is operatively programmed to filter the image frames by applying a spike-removal filter to the image frames.

22. A system for measuring three-dimensional velocities at a plurality of points in a fluid, comprising:

a chamber, wherein the chamber includes a fluid seeded with tracer particles;

at least two cameras positioned to view the fluid seeded with the tracer particles, wherein the at least two cameras being positioned approximately perpendicular to one another, wherein the at least two cameras are operative to provide a plurality of image frames which include views of the tracer particles seeded in the fluid;

at least one computer in operative connection with the at least two cameras, wherein the at least one computer includes:

means for processing the image frames using time-averaged background subtraction with outlier rejection and spike removal filtering means for identifying particle tracks for common particles in multiple image frames for each camera;

means for stereo matching the particle tracks associated with each camera to determining three dimensional coordinates for the tracer particle tracks; and means for calculating velocity for a plurality of points in the fluid responsive to the three dimensional coordinates of particle tracks and time durations between the image frames.

23. The system according to claim 22, wherein the at least one computer further includes:

means for calibrating the cameras using a calibration grid, wherein the means for calibrating the cameras is operative to estimate the location of missing points on the grid imaged by at least one of the cameras.

* * * * *